United States Patent
Knoulich et al.

(10) Patent No.: US 10,002,114 B2
(45) Date of Patent: Jun. 19, 2018

(54) GENERATING INTERACTIVE ELECTRONIC DOCUMENTS

(71) Applicant: GMC Software AG, Appenzell (CH)

(72) Inventors: Jan Knoulich, Hradec Králové (CZ); Didier Rouillard, Pully (CH)

(73) Assignee: GMC SOFTWARE AG, Appenzell (CH)

( * ) Notice: Subject to any disclaimer, the term of this patent is extended or adjusted under 35 U.S.C. 154(b) by 101 days.

(21) Appl. No.: 14/183,396

(22) Filed: Feb. 18, 2014

(65) Prior Publication Data
US 2014/0237349 A1    Aug. 21, 2014

(30) Foreign Application Priority Data
Feb. 19, 2013   (CH) .......................................... 481/13

(51) Int. Cl.
*G06F 17/22*   (2006.01)

(52) U.S. Cl.
CPC .......... *G06F 17/2247* (2013.01); *G06F 9/451* (2018.02)

(58) Field of Classification Search
CPC .......................... G06F 17/243; G06F 17/30861
See application file for complete search history.

(56) References Cited

U.S. PATENT DOCUMENTS

| | | | |
|---|---|---|---|
| 5,956,483 A | 9/1999 | Grate et al. | |
| 6,065,012 A | 5/2000 | Balsara et al. | |
| 6,263,346 B1 | 7/2001 | Rodriquez | |
| 6,836,774 B2 * | 12/2004 | Melbin | G06F 17/30902 707/770 |
| 7,200,811 B1 * | 4/2007 | Takashima | G06F 17/243 715/210 |
| 9,063,921 B1 * | 6/2015 | Cogan | G06F 17/248 |
| 2003/0009563 A1 * | 1/2003 | Douglis | G06F 17/30893 709/227 |
| 2004/0080529 A1 * | 4/2004 | Wojcik | G06F 21/36 715/738 |
| 2005/0094207 A1 * | 5/2005 | Lo | G06F 17/243 358/1.18 |
| 2005/0120308 A1 | 6/2005 | Gibson et al. | |
| 2005/0188051 A1 * | 8/2005 | Sneh | G06F 17/243 709/213 |
| 2006/0168325 A1 * | 7/2006 | Wood | G06F 17/30902 709/238 |

(Continued)

FOREIGN PATENT DOCUMENTS

EP    2128757 A2 * 12/2009 .......... G06F 9/4443

*Primary Examiner* — Scott Baderman
*Assistant Examiner* — Mario M Velez-Lopez
(74) *Attorney, Agent, or Firm* — Knobbe, Martens, Olson & Bear, LLP

(57) ABSTRACT

A computer-implemented method of generating interactive electronic documents comprises: generating each of the electronic documents as an object having a non-variable first part, the non-variable first part comprising instructions configured to direct a processing unit to perform a function call in response to user interaction, and a variable second part separate from the non-variable first part, the variable second part comprising variable data and functions defined to return the variable data in response to the function call. The invention provides generating interactive electronic documents at high speed, in particular in order to enable high throughput.

21 Claims, 3 Drawing Sheets

(56) References Cited

U.S. PATENT DOCUMENTS

| | | | | |
|---|---|---|---|---|
| 2007/0130505 A1* | 6/2007 | Woods | ............... | G06F 17/243 |
| | | | | 715/224 |
| 2009/0300110 A1* | 12/2009 | Chene | ............... | G06Q 10/10 |
| | | | | 709/203 |
| 2013/0110963 A1* | 5/2013 | Han | ............... | H04L 67/42 |
| | | | | 709/213 |
| 2014/0032485 A1* | 1/2014 | Perelman | ............... | G06F 17/243 |
| | | | | 707/608 |

* cited by examiner

GENERATING INTERACTIVE ELECTRONIC DOCUMENTS

INCORPORATION BY REFERENCE TO ANY PRIORITY APPLICATIONS

Any and all applications for which a foreign or domestic priority claim is made are identified in the Application Data Sheet filed with the present application and are incorporated by reference under 37 CFR 1.57 and made a part of this specification.

BACKGROUND

Field of the Invention

The present invention relates to a computer-implemented method and a computer system for generating interactive electronic documents.

Background Art

Electronic documents are widely used to store, transmit, and receive information, for example in customer communication. Electronic documents may adhere to document formats such as HTML (Hypertext Markup Language), PDF (Portable Document Format), PS (PostScript), etc. On receipt, besides usual printing of the electronic document, a user may display the electronic document on a computer display. In case of an interactive electronic document, user interaction may be used to adjust a document readout when displaying the electronic document. Using a mouse to move a cursor and to select a specific item of the displayed interactive document, or by touching a specific item on a touch-screen, a user may invoke functions to change how the information stored in an electronic document is displayed. For example, an electronic document may include a list of towns, which are displayed together with a first button for sorting the list alphabetically, and a second button for sorting the list according to a geographic distance from a geographic reference. By pressing the respective button, a user may change the displayed list of towns interactively. At the date of filing of the present specification, an interactive document including a sortable list of towns is published on http://de.selfhtml.org/dhtml/modelle/dom.htm, which uses an extension of the HTML format according to the Document Object Model (DOM) defined by the World Wide Web Consortium (W3C). DOM is a platform- and language-neutral interface, which allows programs and scripts to dynamically access and update the content, structure and style of documents.

In customer communication, interactive electronic documents are to be generated and delivered to customers consistently at high speed. In the prior art, however, generation of interactive electronic documents is time consuming and cumbersome.

US 2003/0025732 relates to graphical user interfaces for use in computer systems. A display/editor text file is stored in a first format and a screen layout text file is stored in a second format different from the first format. In response to an input to an operator interface, application software combines current system data with data derived from the display/editor text file to create a populated display/text in said first format. Web scripting software creates a display text in the second format based at least in part on the screen layout text file and the populated display/editor text file. Web browser software displays a user interface on a display monitor based on the display text.

U.S. Pat. No. 7,665,014 relates to rendering a form of a selected form type on multiple different types of display targets. A data model and a form type to render the form are selected. A schema including fields corresponding to the data model associated with the form type is identified. Fields are selected on preference. Meta data associated with the selected fields is determined. Multiple layouts including interface areas corresponding to the selected fields and specifying how the form is to be rendered on different display targets are identified. The form is rendered on different display targets using the identified multiple layouts and the meta data.

U.S. Pat. No. 7,620,893 relates to using features of a software application. A user selects a layout, which is to be used in creating an informational display for displaying results of a data repository query. At least one input field and an image are displayed to the user, the image being a sample informational display based on the selected layout and the at least one input field being displayed in association with at least one feature of the image. Via the input field, a user input is received and used for modifying the at least one feature of the image in a new informational display. The at least one input field may be displayed on top of the displayed sample image, in close proximity to the shown feature.

US 2007/0219973 relates to dynamic statement processing in database systems. A first set of characteristics associated with a dynamic statement is calculated when the dynamic statement matches one of a plurality of dynamic statements previously processed by the database system. The first set of characteristics is compared to a second set of characteristics associated with one of one or more access paths generated for the one previously processed dynamic statement. The one access path is utilized to execute the dynamic statement when the comparison of the first set of characteristics to the second set of characteristics satisfies one or more predetermined criteria.

SUMMARY

It is an object of this disclosure to provide a method and a computer system for generating interactive electronic documents, which do not have at least some of the disadvantages of the prior art. In particular, it is an object of the present invention to provide a method and a computer system for generating interactive electronic documents at high speed, in particular in order to enable high throughput.

According to some embodiments of the present invention, the above-mentioned objects are particularly achieved in that a computer-implemented method of generating interactive electronic documents comprises: generating each of the electronic documents as an object having a non-variable first part, the non-variable first part comprising instructions configured to direct a processing unit to perform a function call in response to user interaction, and a variable second part separate from the non-variable first part, the variable second part comprising variable data and functions defined to return the variable data in response to the function call. For example, the non-variable first part may be directed towards the layout of the interactive electronic document, such as the size and layout, whereas the variable second part may be directed towards tables, fields, etc. of the interactive electronic document which have to be shown according to user interaction, such as sorting a list of shown data elements alphabetically or according to a date. The complexity of the non-variable first part differs from the complexity of the variable second part and adequate processing power can be provided when generating the object having the non-variable first part and the variable second part in order to increase speed and throughput.

In an embodiment, a plurality of the electronic documents are generated as objects having the same non-variable first part. As the same non-variable first part is used for the generated interactive electronic documents, speed and throughput may be further increased.

In an embodiment, the electronic documents are personalized for a particular user by inserting in the variable second part variable data linked to the particular user. Variable data linked to the particular user (user specific data) may directly include variables, arrays, characters, etc. relating to the user, wherein the generated interactive electronic document may be processed off-line. In a variant, variable data linked to the particular user may include access information to retrieve the respective data from a remote database, wherein the generated interactive electronic document needs to be processed on-line.

In an embodiment, the electronic documents are generated by a processor storing the same non-variable first part for the plurality of the electronic documents once in a fixed fashion in local data memory of the processor, and loading the variable data individually for each of the electronic documents from a data store arranged externally to the processor. As the non-variable first part remains stored in the local data memory of the processor, high speed and high throughput generation of electronic documents is enabled.

In an embodiment, the electronic documents are generated as objects having a non-variable first part comprising instructions configured to direct a processing unit to show on a display user interface elements enabling the user interaction, to perform the function call depending on the user interaction, and to show on the display the variable data returned in response to the function call. The non-variable first part includes instructions for performing user interaction, which requires careful design and therefore is time consuming during generation of the interactive electronic document. The variable second part comprises simple functions returning values only (e.g. of user specific data elements), which may be performed easily and fast during generation of the interactive electronic document. Hence, speed and throughput for generating interactive electronic documents is further improved.

In an embodiment, the electronic documents are generated as objects having a non-variable first part, comprising instructions in a markup language and instructions for the function call in a language for a virtual machine, and a variable second part, comprising instructions for the function in the language for the virtual machine. Markup languages such as HTML and virtual machines for languages such as Java or JavaScript are widely deployed in user terminals. Accordingly, the interactive electronic documents may be shown and used on practically every user terminal.

In addition to a method of generating interactive electronic documents, the present invention further relates to a computer system for generating interactive electronic documents, the computer system comprising one or more processors and being programmed to implement at least: a document generator configured to generate each of the electronic documents as an object having a non-variable first part, the non-variable first part comprising instructions configured to direct a processing unit to perform a function call in response to user interaction, and a variable second part separate from the non-variable first part, the variable second part comprising variable data and functions defined to return the variable data in response to the function call.

In an embodiment, the document generator is configured to generate a plurality of the electronic documents as objects having the same non-variable first part.

In an embodiment, the document generator is configured to personalize the electronic documents for a particular user by inserting in the variable second part variable data linked to the particular user.

In an embodiment, the document generator is configured to generate a plurality of the electronic documents by storing the same non-variable first part for the plurality of the electronic documents once in a fixed fashion in local data memory of the one or more processors, and by loading the variable data individually for each of the electronic documents from a data store arranged externally to the one or more processors.

In an embodiment, the document generator is configured to generate the electronic documents as objects having a non-variable first part, comprising instructions configured to direct a processing unit to show on a display user interface elements enabling the user interaction, to perform the function call depending on the user interaction, and to show on the display the variable data returned in response to the function call.

In an embodiment, the document generator is configured to generate the electronic documents as objects having a non-variable first part, comprising statements in a markup language and instructions for the function call in a language for a virtual machine, and a variable second part, comprising instructions for the function in the language for the virtual machine.

Moreover, the present invention relates to a computer program product comprising a computer readable medium having stored thereon computer program code for controlling one or more processors of a computer system such that the computer system generates interactive electronic documents by: generating each of the electronic documents as an object having a non-variable first part, the non-variable first part comprising instructions which direct a processing unit to perform a function call in response to user interaction, and a variable second part separate from the non-variable first part, the variable second part comprising variable data and functions defined to return the variable data in response to the function call.

BRIEF DESCRIPTION OF THE DRAWINGS

The herein described invention will be more fully understood from the detailed description given herein below and the accompanying drawings which should not be considered limiting to the invention described in the appended claims:

DETAILED DESCRIPTION OF SPECIFIC EMBODIMENTS

Figure 1:
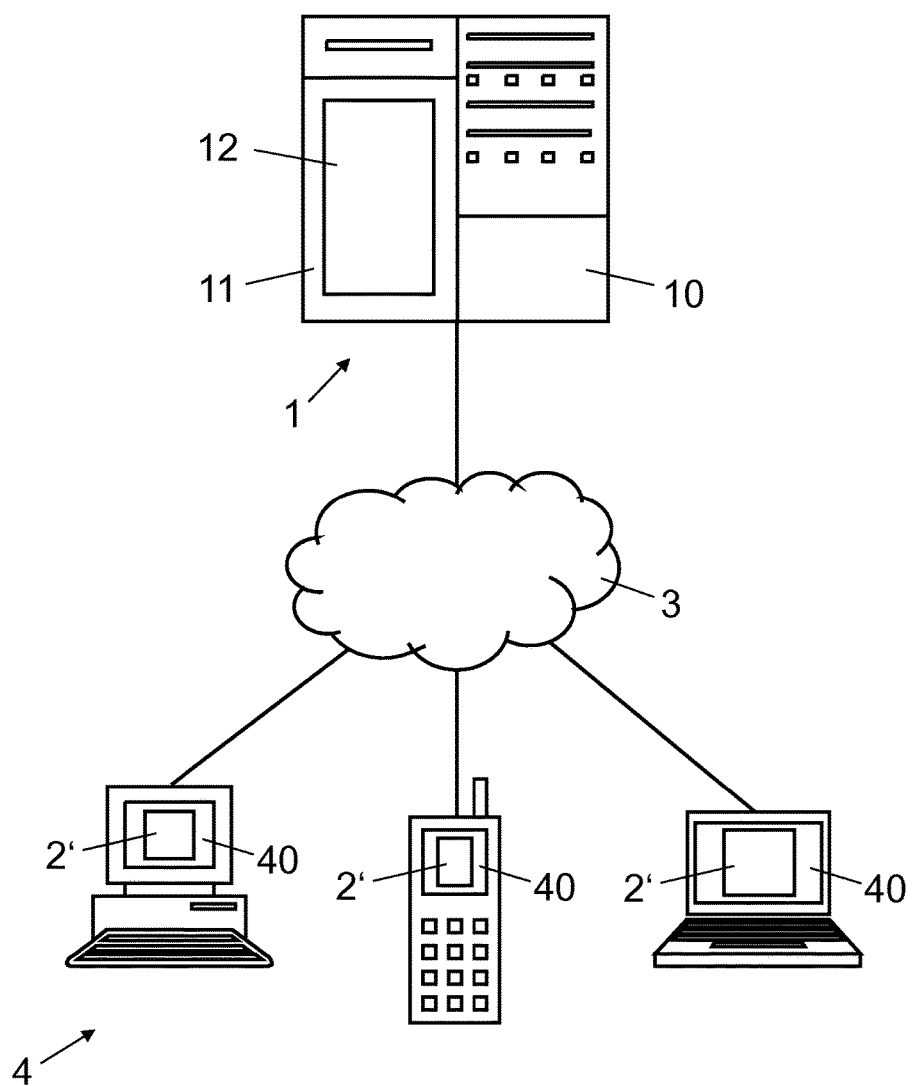
FIG. 1 shows a block diagram illustrating schematically a computer system and user terminals connected via a telecommunications network.

FIG. 1 shows a block diagram illustrating schematically a computer system 1 and user terminals 4. The computer system 1 and the user terminals 4 include various functional modules. In a variant, the computer system 1 and/or the user terminals 4 run an operating system such as Microsoft Windows®, Apple OS X®, Linux, Apple iOS®, Android, etc. The functional modules may be implemented as programmed software modules comprising computer program code. The computer program code of the software modules may be included in a computer program product, e.g. stored on a computer readable medium, either in memory integrated in the computer system 1 or the user terminals 4, or on a non-transitory, tangible storage medium which can be inserted into or connected to the computer system 1 or the user terminals 4. The computer program code of the software modules controls the computer system 1 and user terminals 4, in particular one or more processors of the computer system 1 and the user terminals 4, so that various functions as described in the following paragraphs are executed. One skilled in the art will understand, however, that in alternative embodiments, the functional modules can be implemented fully or partly by way of hardware components.

Figure 2:
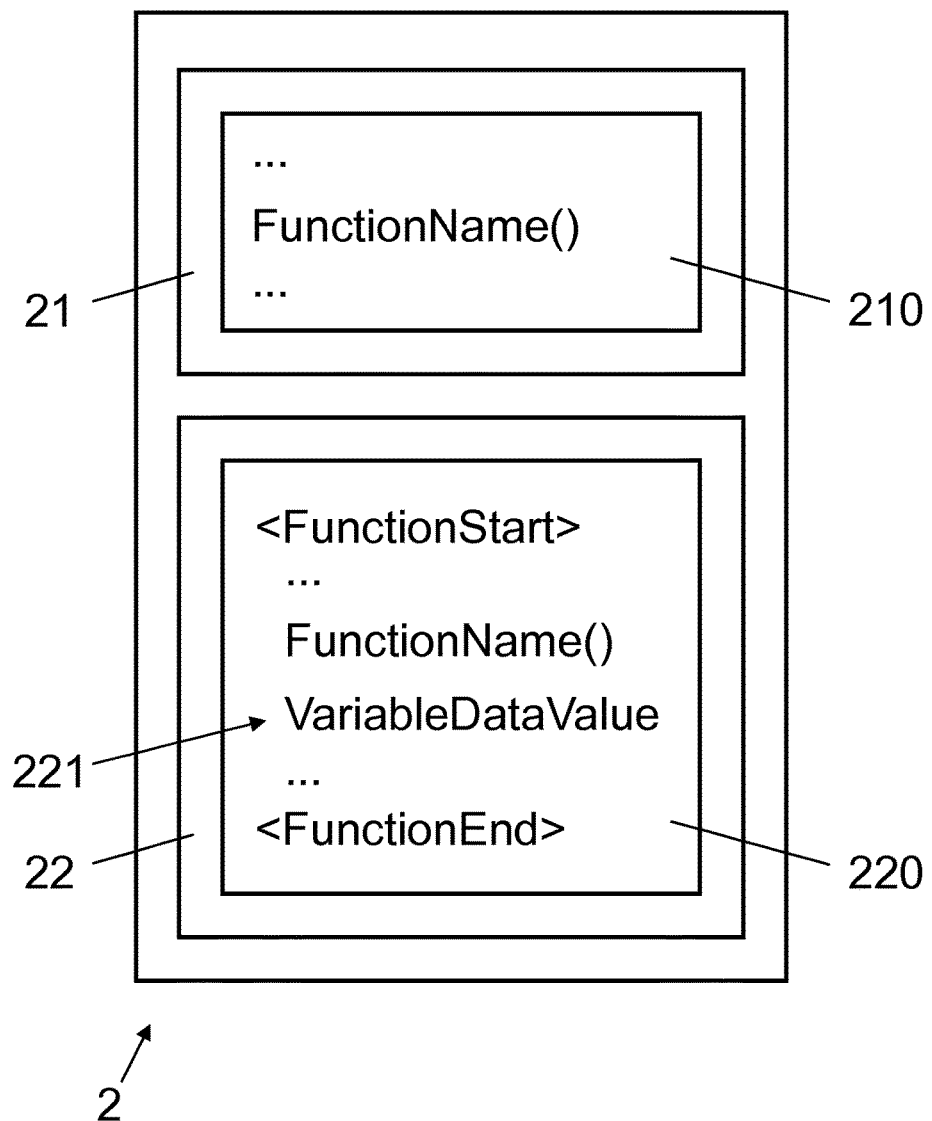
FIG. 2 shows a block diagram illustrating schematically an interactive electronic document.
Figure 3:
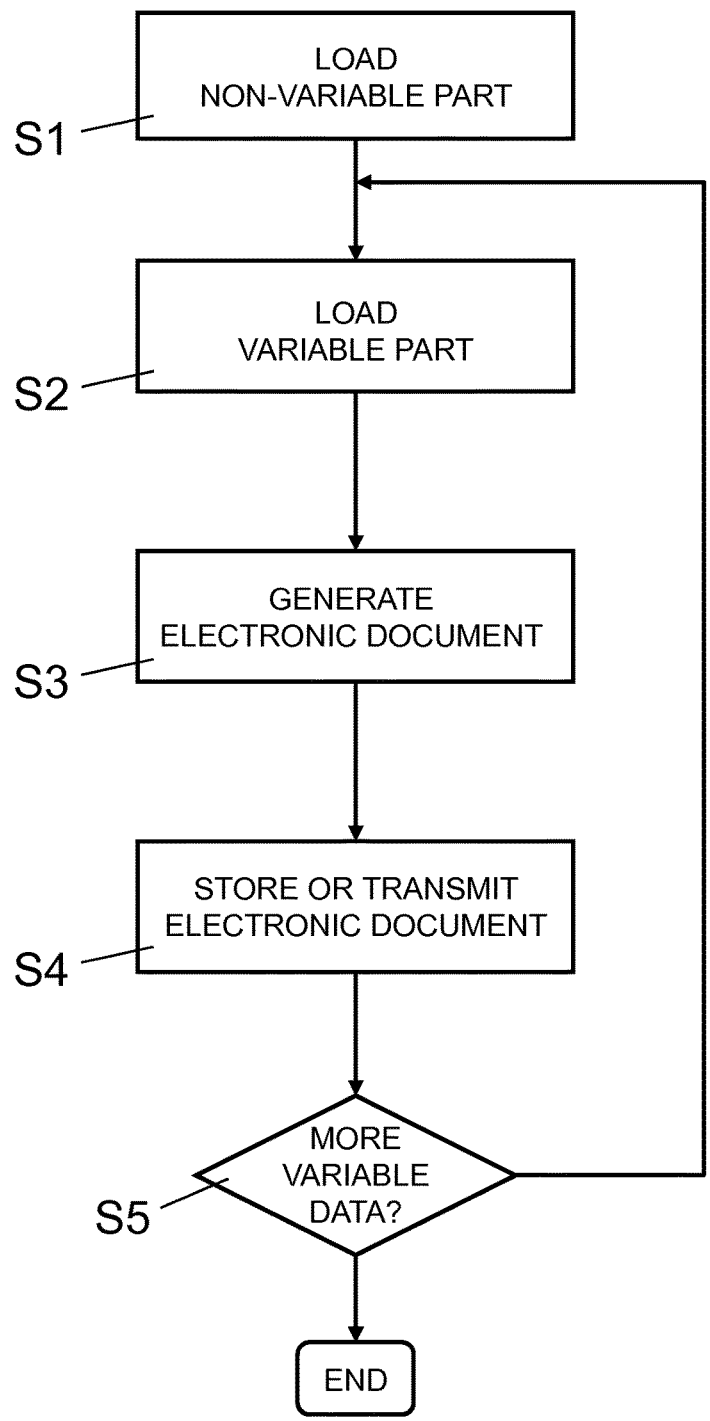
FIG. 3 shows a flow diagram illustrating an exemplary sequence of steps for generating interactive electronic documents.

As indicated in FIG. 1, the computer system 1 includes a data store 11 for storing source data 12 and a document generator 10 for generating interactive electronic documents 2 according to the invention, as schematically shown in FIG. 2 and discussed below.

In a variant, the computer system 1 includes a wired and/or wireless communication interface enabling communication via a telecommunications network 3. In particular, the communication interface of the computer system 1 includes functionalities conforming to the Internet Protocol and the telecommunications network 3 refers to the worldwide Internet accessible via wired and/or wireless communication interfaces. The computer system 1 may refer to a personal computer, a computer server, a server farm, or to any other computer system.

In a variant, the user terminals 4 include wired and/or wireless communication interfaces enabling communication via the telecommunication network 3. In particular, the communication interfaces include functionalities conforming to the Internet Protocol and enabling communication via the worldwide Internet. The user terminals 4 may refer to personal computers, laptop computers, tablet computers, mobile phones, or to any other user terminal.

A user terminal 4 as shown in FIG. 1 may include a terminal display 40, which may be enabled to display a graphical user interface and/or to show a document readout 2' of the interactive electronic document 2, i.e. an output or rendering of the interactive electronic document 2. A user terminal 4 may include peripheral equipment such as a keyboard, a mouse, etc. enabling user interaction with the respective user terminal 4. In a variant, a user terminal 4 includes a touch-screen for displaying a graphical user interface and/or a document readout 2' on the touch-screen and for receiving user interaction via the touch-screen.

On a user terminal 4, depending on the document format such as HTML, PDF, etc. of an interactive electronic document 2, a document readout 2' of the interactive electronic document 2 may be provided through software programs such as Internet Explorer® in case of a document in HTML format, Adobe Reader® in case of a document in PDF format, etc.

User interaction of a user interacting with a user terminal 4 may relate to the user selecting on the display 40 of the user terminal 4 user interface elements shown in the document readout 2' of the interactive electronic document 2, or displayed on the graphical user interface of the user terminal 4, such as windows, menus, buttons, radio buttons, check boxes, list boxes, text fields, icons, etc. In a variant, user interaction is visually confirmed to the user, for example by changing colour, size, visual appearance, etc. of user interface elements shown or displayed.

FIG. 2 shows a block diagram illustrating schematically an interactive electronic document 2 according to the invention. The interactive electronic document 2 includes a non-variable first part 210 and a variable second part 22. In a variant, the interactive electronic document 2 is encoded in a document format according to a markup language, such as HTML (HTML: Hypertext Markup Language), SGML (SGML: Standard Generalized Markup Language), or any other markup language. In a variant, the interactive electronic document 2 is encoded in a document format according to a document format defined by an industry standard and/or company, such as PDF (Portable Document Format defined by Adobe Systems Inc.), DOC (Word® document defined by Microsoft), or any other document format. In a variant, the interactive electronic document 2 is encoded in any other document format.

As shown schematically in FIG. 2, the non-variable first part 21 includes instructions 210 configured to direct a processing unit to perform a function call in response to user interaction. In the interactive electronic document 2 as schematically shown in FIG. 2, a function with name "FunctionName( )" is called. The instructions 210 may be defined according to the HTML standard, for example. Hence, an interactive electronic document 2 according to the HTML standard may include a button which is defined to execute the function with name "ButtonFunction( )" when the button is clicked, which may be implemented using the following code element <input type="button" . . . onclick="ButtonFunction( )">.

As shown schematically in FIG. 2, the variable second part 22 comprises variable data 221, e.g. user specific data, and functions 220. For example, according to the exemplary interactive electronic document 2 as schematically shown in FIG. 2, the variable second part 22 may be defined by a start tag <FunctionStart> and an end tag <FunctionEnd>, wherein in-between a function named "FunctionName( )" is included, which is configured to return variable data 221 named "VariableDataValue" when called. The functions may be defined according to the HTML standard, for example. Hence, an interactive electronic document 2 according to the HTML standard may include a function "Zvalue( )" which is defined to return the data element "Z" when the function is called, which may be implemented using the following code element: function Zvalue( ) {return "Z";}.

Above examples with respect to the HTML standard and the functions "ButtonFunction( )" and "Zvalue( )" may be combined to update a document readout 2' of the electronic document 2 using the following definition of the function "ButtonFunction( )", for example: function ButtonFunction( ) {window.document.Display.FormZ.value= window.document.Display.FormZ.value+Zvalue( );}. Accordingly, when a user clicks the button displayed on the document readout 2' of the interactive electronic document 2, the function "ButtonFunction" is called, which updates "FormZ" of the document readout 2' using the value returned by the function "Zvalue( )".

In a variant, the interactive electronic document 2 comprising the non-variable first part 21 and the variable second part 22, in particular the instructions 210 included in the non-variable first part 21, and/or the functions 220 and/or variable data 221 included in the variable second part 22, are generated as defined by source data 12 stored in the data source 11 of the computer system 1. Additionally or alternatively, the interactive electronic document 2 is generated in accordance to data stored in a database remote to the computer system 1.

Turning back to the interactive electronic document 2 shown in FIG. 2 and the user terminals 4 shown in FIG. 1, in an example, the function named "FunctionName( )" of the instructions 210 of the non-variable first part 21 corresponds to a user interface element, such as a pressable button, which is displayed on the display 40 of a user terminal 4, in particular on the document readout 2' of the interactive electronic document 2. If a user interacts with the user terminal 4 and the displayed interface element, for example by pressing the displayed pres sable button on a touchscreen, the function call to the function named "FunctionName( )" of the functions 220 stored in the variable second part 22 is performed. In response to the function call, the variable data 221 is returned and shown on the display 40. In particular, the document readout 2' of the interactive electronic document 2 is updated according to the variable data 221 returned by the function "FunctionName( )".

The tasks such as display of the document readout 2' and the interactive elements, control of user interaction and corresponding function calls, update of the document readout 2' according to the function calls etc. are performed in accordance with the document format involved using a software program such as Internet Explorer®, Adobe Reader®, etc.

The interactive electronic documents 2 are personalized for a particular user by inserting in the second variable part 21 variable data 221 linked to the particular user. The variable data 221 linked to the particular user may include, for example, subscriber information of a telecom provider, such as address data, telephone numbers, call information, invoices, etc. However, variable data 221 linked to the particular user may include any other information.

The variable data 221 linked to the particular user include data structures such as fields, arrays, etc. of integers, floats, characters, etc., such that relevant data linked to the user is directly stored in the variable data 221 and therefore accessible off-line. Accordingly, the corresponding interactive electronic document 21 may be displayed to the user off-line. In addition or alternatively variant, the variable data 221 linked to the particular user includes data such as a database address, database access information, database queries, etc., such that relevant data linked to the user is accessed from a remote database. Accordingly, the corresponding interactive electronic document 21 requires on-line access to the remote databases involved.

A plurality of interactive electronic documents 2 are generated as objects having the same non-variable first part 21. For example, the non-variable first part 21 includes instructions 210 and document data, which is common for all customers of a telecom provider, such as layout, field names, and interface elements for performing standard interactive operations on the interactive electronic document 2. For example, throughout interactive electronic documents, display of recent invoices as well as sorting the displayed invoices according to the date, invoiced amount, number of calls, etc. may be provided using the same non-variable first part 21 in each of the generated electronic documents 2.

A plurality of electronic documents 2 are generated by a processor storing the same non-variable first part 21 for the plurality of the electronic documents 2 once in a fixed fashion in local data memory of the processor, and the variable data 221 is loaded individually for each of the interactive electronic document 2 for a data store 11 arranged externally to the processor. For example, the non-variable first part 21 is stored in a random access memory (RAM) of the computer system 1 and/or in a cache of a processor of the computer system 1, whereas the variable data 221 is loaded from a disk drive connected to the computer system 1, or from a database remote to the computer system 1. Accordingly, the respective non-variable first part 21 needs to be loaded only once into a memory of the computer system 1 and therefore processing time for generating a large number of interactive electronic documents 2 can be reduced.

In a variant, the interactive electronic documents 2 are generated as objects having a non-variable first part 21 comprising instructions 210 in a markup language and instructions 210 for the function call in a language for a virtual machine, and a variable second part 22 comprising instructions for the function 220 in the language for the virtual machine. The markup language may relate to HTML, XML (Extended Markup Language), or any other markup language. The virtual machine may relate to a virtual machine for performing function calls in a language such as Java, JavaScript, VBScript, etc.

In the following paragraphs, possible sequences of steps performed by the functional modules of the computer system 1 for generating interactive electronic documents 2 are described.

In a first step S1, the non-variable first part 21 is loaded into a memory such as a random access memory (RAM) of the computer system 1, preferably in a fixed fashion, i.e. by allocating a fixed-size, static memory space in the random access memory and by loading the non-variable first part 21 in the allocated memory space. For example, the non-variable first part 21 is loaded fully or partly from a data source 12 stored in a data store 11 of the computer system 1. In a variant, the non-variable first part 21 is loaded fully or partly from a remote database. As described previously, the non-variable first part 21 comprises instructions 210 configured to direct a processing unit to perform a function call in response to user interaction.

In a second step S2, the variable second part 22 is loaded into a memory such as a random access memory (RAM) of the computer system 1, preferably in a dynamic fashion, i.e. by allocating a variable-size, dynamic memory space in the random access memory and by loading the variable second part 22 in the allocated memory space. For example, the variable second part 22 is loaded fully or partly from a data source 12 stored in a data store 11 of the computer system 1, or from a remote database. As described previously, the variable second part 22 is separate from the non-variable first part 21 and comprises variable data 221 and functions 220 defined to return the variable data 221 in response to the function call. In particular, the variable second part 22 includes variable data 221 linked to a particular user (user specific data), such as a user of a telecom provider, for example a user identification, electronic user address, user call statistics, user invoices, etc.

In a third step S3, the interactive electronic document 2 is generated as an object having the non-variable first part 21 loaded in the first step S1 and the variable second part 22 loaded in the second step S2. For example, the object includes one or more pointers to the respective locations of the non-variable first part 21 loaded in the first step S1 and the variable second part 22 loaded in the second step S2. In a variant, the object is stored in a dynamically allocated memory space of the computer system 1 by concatenating the non-variable first part 21 and the variable second part 22. In a variant, the generated object adheres to a document format such as HTML, PDF, etc.

In a fourth step S4, the interactive electronic document 2 is stored or transmitted to a remote site. For example, the interactive electronic document 2 is stored on a storage medium such as a hard disk of the computer system 1, or transmitted to a remote computer such as a user terminal 4. In a variant, the interactive electronic document 2 is stored in a document format such as HTML, PDF, etc. In a variant, the interactive electronic document 2 is transmitted to an e-mail address of a user of a telecom provider.

In a fifth step S5, it is checked if more variable data is to be processed, in particular by checking if the data source 12 of the data store 11 and/or a remote database include more data. For example, it is checked if users of a telecom provider remain for which interactive electronic documents 2 have to be generated. If such data is available, the respective data is loaded into the variable second part 22, in order to generate and store or transmit the respective interactive electronic document 2. If no such data is available anymore, the sequence of steps for generating interactive documents 2 ends.

REFERENCE NUMERALS 1 computer system
10 document generator
11 data store
12 source data
2 interactive electronic document
21 non-variable first part of electronic document
210 instructions
22 variable second part of electronic document
220 functions
221 variable data
2' document readout
3 telecommunications network
4 user terminal
40 display of user terminal

What is claimed is:

1. A computer-implemented method of generating interactive electronic documents, the method comprising:
by a computer system comprising one or more hardware processors, generating a plurality of electronic documents, each of the electronic documents generated as an object having a non-variable first part, the non-variable first part comprising instructions configured to direct a processing unit to perform a function call in response to a user interaction, and a variable second part separate from the non-variable first part, the variable second part comprising variable data and functions defined to return the variable data in response to the function call, wherein the variable second part comprises either variable data enabling off-line processing of the document or access information to retrieve the respective data from a remote database requiring on-line processing of the document, wherein the instructions of the non-variable first part are in a first programming language and the instructions for the function call are in a second programming language, wherein the first language is a markup language and the second language is a language for a virtual machine, and the variable second part further comprising instructions for the function in the language for the virtual machine, wherein the second language is a scripting language.

2. The method of claim 1, wherein at least two of the plurality of electronic documents are generated as objects having the same non-variable first part.

3. The method of claim 1, wherein each of the electronic documents are personalized for a particular user by inserting variable data linked to the particular user in the variable second part.

4. The method of claim 1, wherein the plurality of the electronic documents are generated by a processor storing the same non-variable first part for the plurality of electronic documents once in a fixed fashion in local data memory of the processor, and loading the variable data individually for each of the electronic documents from a data store arranged externally to the processor.

5. The method of claim 1, wherein the non-variable first part further comprising instructions configured to direct a processing unit to show on a display user interface elements enabling the user interaction, to perform the function call depending on the user interaction, and to show on the display the variable data returned in response to the function call.

6. The method of claim 1, wherein the variable data includes at least one of: a database address, database access information, and a database query; and the functions are defined to access and return the variable data from the remote database.

7. A computer system for generating interactive electronic documents, the computer system comprising one or more processors and being programmed to implement at least:
a document generator configured to generate a plurality of electronic documents, each of the electronic documents generated as an object having a non-variable first part, the non-variable first part comprising instructions configured to direct a processing unit to perform a function call in response to user interaction, and a variable second part separate from the non-variable first part, the variable second part comprising variable data and functions defined to return the variable data in response to the function call, wherein the variable second part comprises either variable data enabling off-line processing of the document or access information to retrieve the respective data from a remote database requiring on-line processing of the document, wherein the instructions of the non-variable first part are in a first programming language and the instructions for the function call are in a second programming language, wherein the first language is a markup language and the second language is a language for a virtual machine, and the variable second part further comprising instructions for the function in the language for the virtual machine, wherein the second language is a scripting language.

8. The computer system of claim 7, wherein the document generator is configured to generate two or more of the plurality of electronic documents as objects having the same non-variable first part.

9. The computer system of claim 7, wherein the document generator is configured to personalize each of the electronic documents for a particular user by inserting in the variable second part variable data linked to the particular user.

10. The computer system of claim 7, wherein the document generator is configured to generate the plurality of the electronic documents by storing the same non-variable first part for the plurality of the electronic documents once in a fixed fashion in local data memory of the one or more processors, and by loading the variable data individually for each of the electronic documents from a data store arranged externally to the one or more processors.

11. The computer system of claim 7, wherein the non-variable first part further comprising instructions configured to direct a processing unit to show on a display user interface elements enabling the user interaction, to perform the function call depending on the user interaction, and to show on the display the variable data returned in response to the function call.

12. The computer system of claim 7, wherein the variable data includes at least one of: a database address, database access information, and a database query; and the functions are defined to access and return the variable data from the remote database.

13. A non-transitory computer readable medium having stored thereon computer program code for controlling one or more processors of a computer system such that the computer system generates interactive electronic documents by:
generating a plurality of electronic documents, each of the electronic documents generated as an object having a non-variable first part, the non-variable first part comprising instructions which direct a processing unit to perform a function call in response to user interaction, and a variable second part separate from the non-variable first part, the variable second part comprising variable data and functions defined to return the variable data in response to the function call, wherein the variable second part comprises either variable data enabling off-line processing of the document or access information to retrieve the respective data from a remote database requiring on-line processing of the document, wherein the instructions of the non-variable first part are in a first programming language and the instructions for the function call are in a second programming language, wherein the first language is a markup language and the second language is a language for a virtual machine, and the variable second part further comprising instructions for the function in the language for the virtual machine, wherein the second language is a scripting language.

14. The computer readable medium of claim 13, wherein at least two of the plurality of electronic documents having the same non-variable first part.

15. The computer readable medium of claim 13, wherein each of the plurality of the electronic documents are personalized for a particular user by inserting variable data linked to the particular user in the variable second part.

16. The computer readable medium of claim 13, wherein the plurality of the electronic documents are generated by a processor storing the same non-variable first part for the plurality of electronic documents once in a fixed fashion in local data memory of the processor, and loading the variable data individually for each of the electronic documents from a data store arranged externally to the processor.

17. The computer readable medium of claim 13, wherein the non-variable first part further comprising instructions configured to direct a processing unit to show on a display user interface elements enabling the user interaction, to perform the function call depending on the user interaction, and to show on the display the variable data returned in response to the function call.

18. The computer readable medium of claim 13, wherein the computer program code is further configured to control the one or more processors of the computer system such that the computer system includes in the variable data at least one of: a database address, database access information, and a database query; and includes the functions configured to access and return the variable data from the remote database.

19. A computer-implemented method of generating interactive electronic documents, the method comprising:
by a computer system comprising one or more hardware processors, generating a plurality of electronic documents, each of the electronic documents generated as an object having a non-variable first part, the non-variable first part comprising instructions configured to direct a processing unit to perform a function call in response to a user interaction, and a variable second part separate from the non-variable first part, the variable second part comprising variable data and functions defined to return the variable data in response to the function call, wherein the plurality of the electronic documents are generated by a processor storing the same non-variable first part for the plurality of electronic documents once in a defined location of local data memory of the processor, and loading the variable data individually for each of the electronic documents from a data store arranged remotely to the processor, wherein the variable second part comprises either variable data enabling off-line processing of the document or access information to retrieve the respective data from a remote database requiring on-line processing of the document, wherein the instructions of the non-variable first part are in a first programming language and the instructions for the function call are in a second programming language, wherein the first language is a markup language and the second language is a language for a virtual machine, and the variable second part further comprising instructions for the function in the language for the virtual machine, wherein the second language is a scripting language.

20. The computer-implemented method of claim 19, wherein computer program code for controlling the one or more hardware processors of the computer system in order to execute the computer-implemented method is stored on a non-transitory computer readable medium.

21. A computer system for generating interactive electronic documents, the computer system comprising one or more processors and being programmed to implement at least:
a document generator configured to generate a plurality of electronic documents, each of the electronic documents generated as an object having a non-variable first part, the non-variable first part comprising instructions configured to direct a processing unit to perform a function call in response to a user interaction, and a variable second part separate from the non-variable first part, the variable second part comprising variable data and functions defined to return the variable data in response to the function call, wherein the plurality of the electronic documents are generated by a processor storing the same non-variable first part for the plurality of electronic documents once in a defined location of in local volatile data memory of the processor, and loading the variable data individually for each of the electronic documents from a data store arranged remotely to the processor, wherein the variable second part comprises either variable data enabling off-line processing of the document or access information to retrieve the respective data from a remote database requiring on-line processing of the document, wherein the instructions of the non-variable first part are in a first programming language and the instructions for the function call are in a second programming language, wherein the first language is a markup language and the second language is a language for a virtual machine, and the variable second part further comprising instructions for the function in the language for the virtual machine, wherein the second language is a scripting language.

* * * * *